United States Patent
Hill

(10) Patent No.: US 11,069,983 B2
(45) Date of Patent: Jul. 20, 2021

(54) MODIFIED Z-TYPE HEXAGONAL FERRITE MATERIALS WITH ENHANCED RESONANT FREQUENCY

(71) Applicant: Skyworks Solutions, Inc., Irvine, CA (US)

(72) Inventor: Michael David Hill, Frederick, MD (US)

(73) Assignee: Skyworks Solutions, Inc., Irvine, CA (US)

( * ) Notice: Subject to any disclaimer, the term of this patent is extended or adjusted under 35 U.S.C. 154(b) by 294 days.

(21) Appl. No.: 16/012,418

(22) Filed: Jun. 19, 2018

(65) Prior Publication Data

US 2018/0366835 A1 Dec. 20, 2018

Related U.S. Application Data

(63) Continuation of application No. 14/804,588, filed on Jul. 21, 2015, now Pat. No. 10,027,035.

(60) Provisional application No. 62/057,827, filed on Sep. 30, 2014.

(51) Int. Cl.
| | |
|---|---|
| *H01Q 17/00* | (2006.01) |
| *C04B 35/26* | (2006.01) |
| *C04B 35/626* | (2006.01) |
| *H01F 1/34* | (2006.01) |
| *H01F 41/02* | (2006.01) |
| *C04B 35/645* | (2006.01) |
| *H01F 1/147* | (2006.01) |
| *H01F 17/04* | (2006.01) |
| *H01P 1/36* | (2006.01) |
| *H01P 1/38* | (2006.01) |
| *H01P 11/00* | (2006.01) |
| *H01Q 1/24* | (2006.01) |
| *H01Q 1/48* | (2006.01) |

(52) U.S. Cl.
CPC .......... *H01Q 17/004* (2013.01); *C04B 35/26* (2013.01); *C04B 35/2633* (2013.01); *C04B 35/6261* (2013.01); *C04B 35/62655* (2013.01); *C04B 35/62675* (2013.01); *C04B 35/645* (2013.01); *H01F 1/14708* (2013.01); *H01F 1/348* (2013.01); *H01F 17/04* (2013.01); *H01F 41/0246* (2013.01); *H01P 1/36* (2013.01); *H01P 1/38* (2013.01); *H01P 11/001* (2013.01); *H01Q 1/24* (2013.01); *H01Q 1/48* (2013.01); *C04B 2235/3201* (2013.01); *C04B 2235/3213* (2013.01); *C04B 2235/3215* (2013.01); *C04B 2235/3217* (2013.01); *C04B 2235/3222* (2013.01); *C04B 2235/3272* (2013.01); *C04B 2235/3274* (2013.01); *C04B 2235/3275* (2013.01); *C04B 2235/442* (2013.01); *C04B 2235/5409* (2013.01); *C04B 2235/5436* (2013.01); *C04B 2235/5445* (2013.01); *C04B 2235/604* (2013.01); *C04B 2235/6562* (2013.01); *C04B 2235/6567* (2013.01); *C04B 2235/767* (2013.01); *C04B 2235/786* (2013.01); *C04B 2235/96* (2013.01)

(58) Field of Classification Search
CPC .... C04B 35/2633; H01F 1/348; H01Q 17/004
See application file for complete search history.

(56) References Cited

U.S. PATENT DOCUMENTS

| | | | |
|---|---|---|---|
| 4,425,250 A | 1/1984 | Hibst | |
| 4,469,669 A | 9/1984 | Hibst | |
| 4,664,831 A | 5/1987 | Hibst et al. | |
| 6,893,581 B2 | 5/2005 | Umemoto et al. | |
| 7,482,977 B2 | 1/2009 | Kuroda et al. | |
| 7,679,569 B2 | 3/2010 | Takaki et al. | |
| 7,999,758 B2 | 8/2011 | Bae et al. | |
| 8,228,059 B2 | 7/2012 | Iwasaki et al. | |
| 8,253,643 B2 | 8/2012 | Kato et al. | |
| 8,524,190 B2 * | 9/2013 | Hill ...................... | C01G 49/009 423/594.2 |
| 8,758,721 B2 | 6/2014 | Hill | |
| 10,026,530 B2 | 7/2018 | Hill | |
| 10,027,035 B2 * | 7/2018 | Hill ........................ | C04B 35/26 |
| 10,032,547 B2 | 7/2018 | Hill | |
| 10,049,796 B2 | 8/2018 | Hill | |
| 10,276,287 B2 | 4/2019 | Hill | |
| 10,461,436 B2 | 10/2019 | Hill et al. | |
| 10,604,450 B2 | 3/2020 | Hill et al. | |
| 2003/0091841 A1 | 5/2003 | Marusawa | |
| 2008/0149882 A1 | 6/2008 | Terazono et al. | |
| 2009/0297432 A1 | 12/2009 | Hill | |
| 2010/0156733 A1 | 6/2010 | Kato et al. | |
| 2011/0025572 A1 | 2/2011 | Lee et al. | |
| 2011/0305890 A1 | 12/2011 | Iwasaki et al. | |
| 2012/0177951 A1 | 7/2012 | Yamazaki et al. | |
| 2013/0115160 A1 | 5/2013 | Hill | |

(Continued)

FOREIGN PATENT DOCUMENTS

| | | |
|---|---|---|
| CN | 1405799 | 3/2003 |
| CN | 1528002 | 9/2004 |

(Continued)

OTHER PUBLICATIONS

Aslam et al., "High frequency electrical transport properties of $CoFe_2O_4$ and $Sr_2NiMnFe_{12}O_{22}$ composite ferrites", Ceramics International, 40:155-162 (2014).

(Continued)

*Primary Examiner* — C Melissa Koslow
(74) *Attorney, Agent, or Firm* — Knobbe, Martens, Olson & Bear, LLP

(57) ABSTRACT

Disclosed herein are embodiments of modified z-type hexagonal ferrite materials having improved properties that are advantageous for radiofrequency applications, in particular high frequency ranges for antennas and other devices. Atomic substitution of strontium, aluminum, potassium, and trivalent ions can be used to replace certain atoms in the ferrite crystal structure to improve loss factor at high frequencies.

17 Claims, 12 Drawing Sheets

(56) References Cited

U.S. PATENT DOCUMENTS

| | | |
|---|---|---|
| 2013/0265205 A1 | 10/2013 | Okano et al. |
| 2013/0285874 A1 | 10/2013 | Hill |
| 2013/0292602 A1 | 11/2013 | Hill |
| 2014/0138571 A1 | 5/2014 | Kim et al. |
| 2018/0374616 A1 | 12/2018 | Hill |
| 2019/0006067 A1 | 1/2019 | Hill |
| 2019/0019605 A1 | 1/2019 | Hill |
| 2019/0267164 A1 | 8/2019 | Hill |

FOREIGN PATENT DOCUMENTS

| | | |
|---|---|---|
| CN | 1767087 | 5/2006 |
| CN | 101014548 | 8/2007 |
| CN | 101998934 | 3/2011 |
| CN | 102076629 | 5/2011 |
| EP | 0303151 | 2/1989 |
| EP | 1798210 | 6/2007 |
| EP | 1837949 | 9/2007 |
| EP | 2320434 | 5/2011 |
| EP | 2418730 | 2/2012 |
| JP | S58-41728 | 3/1983 |
| JP | 10-117086 | 5/1998 |
| JP | 2000-173812 | 6/2000 |
| JP | 2002-116632 | 4/2002 |
| JP | 2003-002656 | 1/2003 |
| JP | 2004-040053 | 2/2004 |
| JP | 2006-064839 | 3/2006 |
| JP | 2007-039301 | 2/2007 |
| JP | 2007-055832 | 3/2007 |
| JP | 2007-119321 | 5/2007 |
| JP | 2009-170704 | 7/2009 |
| JP | 2010-114407 | 5/2010 |
| JP | 2011-521865 | 7/2011 |
| JP | 2011-530479 | 12/2011 |
| JP | 2013-183776 | 9/2013 |
| WO | WO 2006/064839 | 6/2008 |
| WO | WO 2010/107098 | 9/2010 |
| WO | WO 2010/117156 | 10/2010 |
| WO | WO 2012/103020 | 8/2012 |

OTHER PUBLICATIONS

European Extended Search Report for Application No. 15191110.4 dated Mar. 14, 2016, in 9 pages.
Extended European Search Report for Application No. 15187687.7, dated Feb. 23, 2016, in 8 pages.
Extended European Search Report for Application No. 15191106.2, dated Feb. 26, 2016, in 11 pages.
European Extended Search Report for Application No. 15191112.0 dated Jun. 17, 2016, in 8 pages.

* cited by examiner

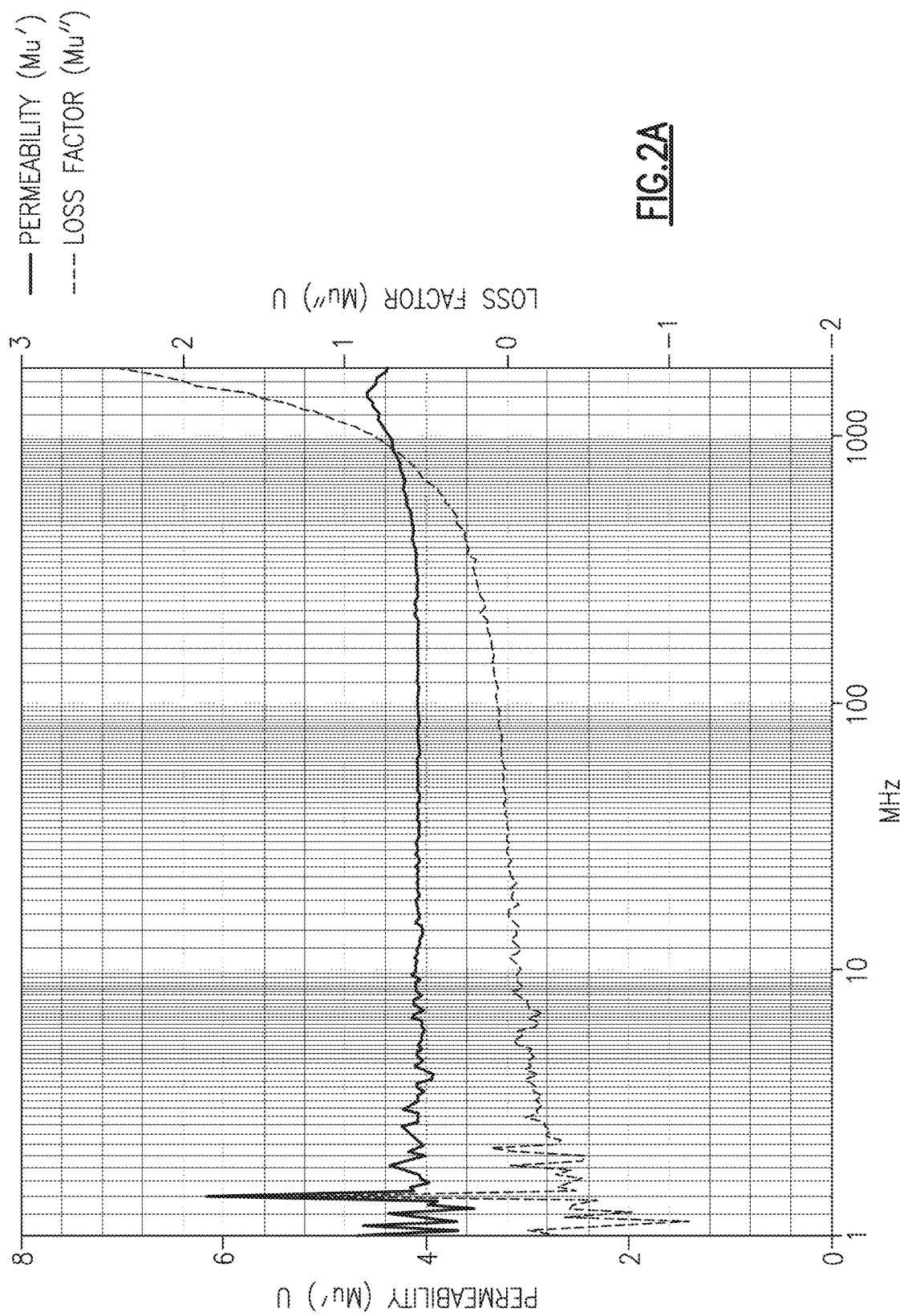

MODIFIED Z-TYPE HEXAGONAL FERRITE MATERIALS WITH ENHANCED RESONANT FREQUENCY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the disclosure relate to methods of preparing compositions and materials useful in electronic applications, and in particular, useful in radio frequency (RF) electronics such as antennas.

SUMMARY

Disclosed herein are embodiments of a high resonant-frequency material composition comprising an enhanced z-type hexagonal ferrite having some barium atoms substituted for strontium atoms and some iron atoms substituted for aluminum atoms, the enhanced z-type hexagonal ferrite having a formula $Ba_{3-x}Sr_xCo_2Fe_{24-y}Al_yO_{41}$ and having a resonant frequency of over about 500 MHz.

In some embodiments, $0<x<1.5$ and $0<y<0.9$. In some embodiments, $x=1.5$ and $y=0.9$. In some embodiments, $x=1.5$ and $y=0.3$. In some embodiments, the enhanced z-type hexagonal ferrite can have a resonant frequency over 1 GHz.

Also disclosed herein are embodiments of a radio frequency device formed from a high resonant-frequency material composition comprising an enhanced z-type hexagonal ferrite having some barium atoms substituted for strontium atoms and some iron atoms substituted for aluminum atoms, the enhanced z-type hexagonal ferrite having a formula $Ba_{3-x}Sr_xCo_2Fe_{24-y}Al_yO_{41}$ and having a resonant frequency of over about 500 MHz.

Also disclosed herein are embodiments of a high frequency antenna comprising a high resonant-frequency material composition comprising an enhanced z-type hexagonal ferrite having some barium atoms substituted for strontium atoms and some iron atoms substituted for aluminum atoms, the enhanced z-type hexagonal ferrite having a formula $Ba_{3-x}Sr_xCo_2Fe_{24-y}Al_yO_{41}$ and having a resonant frequency of over about 500 MHz.

Also disclosed herein are embodiments of a material composition having advantageous microwave properties, the material composition comprising an enhanced z-type hexagonal ferrite having some of the barium atoms substituted for potassium atoms and some of the cobalt atoms substituted for a trivalent ion, the enhanced z-type hexagonal ferrite having a formula $Ba_{3-x}K_xCo_{2-x}M^{(III)}{}_xFe_{24}O_{41}$, $M^{(III)}$ being a trivalent ion.

In some embodiments, $M^{(III)}$ can be selected from the group consisting of Sc, Mn, In, Cr, Ga, Co, Ni, Fe, Yb, or any other lanthanide ions. In some embodiments, $0<x<0.5$. In some embodiments, $M^{(III)}$ can be Co, Mn, Cr, In, or Yb and where $x=0.5$. In some embodiments, the material can have a resonant frequency over 1 GHz.

Also disclosed herein are embodiments of a high frequency antenna comprising a material composition having advantageous microwave properties, the material composition comprising an enhanced z-type hexagonal ferrite having some of the barium atoms substituted for potassium atoms and some of the cobalt atoms substituted for a trivalent ion, the enhanced z-type hexagonal ferrite having a formula $Ba_{3-x}K_xCo_{2-x}M^{(III)}Fe_{24}O_{41}$, $M^{(III)}$ being a trivalent ion.

Also disclosed herein are embodiments of a method of increasing the resonant frequency of a hexagonal ferrite material comprising blending a mixture of precursor materials including barium, cobalt, iron, and oxygen, at least some barium in the precursor material being replaced with strontium and at least some aluminum in the precursor material being replaced with iron or at least some of the barium being replaced by potassium, drying the mixture, heating the dried mixture, milling the dried mixture to form a blend of particles, drying the particles, pressing the dried particles, and sintering the pressed particles to form a hexagonal ferrite material having a resonant frequency greater than 500 MHz.

In some embodiments, alkali addition is not used. In some embodiments, the hexagonal ferrite material can be $Ba_{3-x}Sr_xCo_2Fe_{24-y}Al_yO_{41}$, x being between 0 and 1.5 and y being between 0 and 0.9. In some embodiments, the hexagonal ferrite material can be $Ba_{3-x}K_xCo_{2-x}M^{(III)}{}_xFe_{24}O_{41}$, $M^{(III)}$ being a trivalent ion and x being between 0 and 0.5. In some embodiments, the hexagonal ferrite material has a resonant frequency greater than 1 GHz.

In some embodiments, the method can further comprise forming a radio frequency device from the hexagonal ferrite material. In some embodiments, the method can further comprise forming a high frequency antenna.

BRIEF DESCRIPTION OF THE DRAWINGS

FIGS. 2A-B show impedance spectra for embodiments of the disclosed z-phase hexagonal ferrite materials.

DETAILED DESCRIPTION

Disclosed herein are embodiments of hexagonal ferrite materials, in particular z-type hexagonal ferrite materials, which can have enhanced properties advantageous for high frequency applications. For example, the disclosed hexagonal ferrite materials can undergo atomic substitution to increase permeability while maintaining low loss levels. Further, embodiments of the disclosed hexagonal ferrite material can have improved ferromagnetic resonance linewidth, which can be particularly useful for high frequency applications. Accordingly, due to the enhanced properties of embodiments of the disclosed hexagonal ferrite material, they can be particularly useful for commercial and military applications in the microwave region.

Magneto-dielectric materials (or magnetic materials), such as the disclosed hexagonal ferrite materials, are particularly useful in radiofrequency (RF) devices such as antennas, transformers, inductors, absorbers, and circulators, among others. Some of the desirable properties afforded by magnetic materials can be favorable miniaturizing factors, reduced field concentration, and better impedance match. Hexagonal ferrite systems, in particular, can be advantageous because of their high magnetic permeability at microwave (100 MHz-20 GHz) frequencies.

Figure 1:
FIG. 1 shows the microstructures of $Co_2Z$ of one embodiment at 500× magnification.

Hexagonal ferrites, or hexaferrites, such as Z-phase barium cobalt ferrite ($Ba_3Co_2Fe_{24}O_{41}$), commonly abbreviated as $Co_2Z$, are magneto-dielectric materials often used in high frequency antennas and other RF devices. FIG. 1 illustrates the microstructures of $Co_2Z$ of one embodiment at 500× magnification. Hexagonal ferrite systems can include crystal structures that are generally intergrowths between magnetoplumbite and spinel structures containing barium (Ba) or strontium (Sr), a divalent cation such as iron (Fe), cobalt (Co), nickel (Ni) or manganese (Mn) and trivalent Fe. The hexagonal ferrite may be formed in a variety of different crystal structures based on the magnetoplumbite cell. These structures include M-phase ($BaFe_{12}O_{19}$), W-phase ($BaMe_2Fe_{16}O_{27}$), Y-phase ($Ba_2Me_2Fe_{12}O_{22}$) and Z-phase ($Ba_3Me_2Fe_{24}O_{42}$). While Z-phase hexagonal ferrites are described herein, it would be understood that the disclosed methodologies could be incorporated into other phases as well.

Recent advances in magneto-dielectric materials, such as hexagonal ferrites, are driven in part by the need to miniaturize high frequency antennas while maintaining desirable bandwidth, impedance, and low dielectric loss. Additionally, it is also preferable to increase the upper frequency limit of an antenna, which is largely determined by the resonant frequency of the material used. To improve the performance characteristics of $Co_2Z$ and other hexagonal ferrites, prior art methods are largely focused on substituting certain chemical elements in $Co_2Z$ with others. For example, one such method involves doping $Co_2Z$ with small amounts of an alkali metal such as potassium (K), sodium (Na), or rubidium (Rb) to improve the magnetic permeability of the material at high frequencies, which in turn increases the useable frequency range. However, these chemical substitution solutions are met with only moderate success.

Accordingly, disclosed herein are embodiments of hexagonal ferrites having improved resonant frequencies well above the materials of the prior art, as well as methods for making the hexagonal ferrites. Specifically, embodiments of the present disclosure disclose methods and processing techniques for improving performance characteristics of hexagonal ferrite materials used in high frequency applications, such as improving resonant frequencies of the materials. Certain preferred embodiments provide improved methods and processing techniques for manufacturing Z-phase hexagonal ferrite systems $Ba_3Co_2Fe_{24}O_{42}$ ($Co_2Z$) that have reduced magnetorestriction, improved resonant frequency, and/or extended magnetic permeability at higher frequencies.

Two factors of merit for antenna performance include the miniaturization factor and the bandwidth. First, the miniaturization factor is determined by the formula:

$$d_{eff}=d_o(\varepsilon_r\mu_r)^{-1/2}$$

where $d_{eff}/d_o$ is the miniaturization factor, $\varepsilon_r$ is the dielectric constant of the antenna material, and $\mu_r$ is the magnetic permeability of the antenna material. Both $\varepsilon_r$ and $\mu_r$ are dependent on frequency in magnetic oxide antennas.

Second the effective bandwidth (or efficiency) is determined by the formula:

$$\eta=\eta_o(\mu_r/\varepsilon_r)^{1/2}$$

where $\eta/\eta_o$ describes the efficiency (or bandwidth) of the material. This efficiency is maximized if $\mu_r$ is maximized. In addition, if $\mu_r=\varepsilon_r$, there is a perfect impedance match to free space. Thus, the miniaturization factor is proportional to the square root of the product of the permeability and permittivity at a given frequency. Accordingly, the magnetic interaction with radiofrequency radiation can be utilized to miniaturize an antenna along with a dielectric component, such as the $Co_2Z$ component. Further, it can be advantageous for the material to be insulating and for permittivity and permeability to be as close to one another as possible, thereby minimizing the impedance mismatch and reflection loss.

Moreover, relative permeability and relative permittivity are properties indicative of the performance of a magnetic material in high frequency applications. Relative permeability is a measure of the degree of magnetization of a material that responds linearly to an applied magnetic field relative to that of free species ($\mu_r=\mu/\mu_o$). Relative permittivity ($\varepsilon_r$) is a relative measure of the electronic polarizability of a material to the polarizability of free species ($\varepsilon_r=\varepsilon/\varepsilon_o$). Generally, permeability ($\mu'$) can be separated into two components: spin rotational $X_{sp}$ which is in response for high frequency, and domain wall motion $X_{dw}$ which is damped out at microwave frequencies. Permeability can be generally represented by $\mu'=1+X_{dw}+X_{sp}$.

Further, unlike spinels, $Co_2Z$ systems typically have a non-cubic unit cell, planar magnetization, and an anisotropic spin-rotation component to permeability. Spin rotation anisotropy is also a consideration in preparing $Co_2Z$ for high frequency applications. Large anisotropy fields ($H_\theta$) are similar to applying an external magnetic field which increases resonant frequency, whereas small anisotropy fields ($H_\varphi$) improve permeability. $H_\theta$ is generally strong in hexagonal ferrites, such as $Co_2Z$. As such, domain formation out of the basal plane is suppressed and the material becomes self-magnetizing. The relationship between permeability and rotational stiffness can be represented by the formula $(\mu_o-1)/4\pi=(1/3)(M_s/H_\theta^A+M_s/H_\varphi^A)$. For isotropic rotational stiffness in connection spinels and c-axis oriented hexagonal ferrites, the relationship can be represented as follows: $(\mu_o-1)/4\pi=(2/3)(M_s/H^A)$. For cases where $H_\theta^A$ does not equal to $H_\varphi^A$: $f_{res}(\mu_o-1)=4/3 \ \psi M_s \ [\frac{1}{2} \ (H_\theta^A/H_\varphi^A)+\frac{1}{2}(H_\varphi^A/H_\theta^A)]$. It is believed that the larger the difference in rotational stiffness, the greater the self magnetization field and the greater the resonant frequency, which could push the resonant frequency into the microwave region. Permeability drops quickly above resonance frequency.

Crystal Structure Substitution of Atoms

As mentioned above, it can be advantageous to increase the resonant frequencies of dielectric materials, such as $Co_2Z$, used in miniaturized antenna systems. In particular, operation at frequencies over 500 MHz, 700 MHz, 900 MHz, or 1 GHz with minimal/acceptable signal loss and can allow for more signals to be used with the material, thus providing a greater usable range of signals. This can be especially useful for high microwave frequency applications which are used both commercially and with the military. Embodiments of the below disclosed material can achieve such high operational frequencies, at least in part due to the substitution of certain atoms within the $Co_2Z$ crystal lattice structure. Further, embodiments of the disclosed $Co_2Z$ material can have appreciably low losses.

As mentioned above, $Co_2Z$ material can have a generic formula of $Ba_3Me_2Fe_{24}O_{42}$. In some embodiments, barium (Ba) or iron (Fe) atoms of the $Co_2Z$ material can be replaced (e.g. substituted) in the crystal structure of the hexagonal ferrite material with other atoms. Advantageously, the replacement of the Ba and/or Fe atoms can increase the overall resonant frequency of a $Co_2Z$ material, allowing for the material to be used in higher frequency operations.

In some embodiments at least some of the $Ba^{2+}$ atoms can be replaced by strontium ($Sr^{2+}$) atoms. Further, in some embodiments $Fe^{3+}$ atoms can be replaced for aluminum ($Al^{3+}$) atoms. One or both of the types of atoms (e.g., Ba and Fe) can be substituted out for the new atoms (Sr and Al), which has the result of increasing the resonant frequency of the $Co_2Z$ material. The replacement of atoms can occur during the original formulation by selecting the appropriate amounts of each elemental oxide to create the desired structure with the desired chemistry.

Such an increase in resonant frequency due to the substitution of atoms can occur for a number of reasons. For example, the substitution can cause an overall decrease in the magnetic permeability of the material, which accompanies an increase in resonant frequency. Additionally, the substitution can form an improved crystal structure, which is more preferentially aligned for higher resonant frequencies. Moreover, the substitution can increase the ferromagnetic resonance of the material, which allows it to be used at higher resonant frequencies. However, other reasons can be understood to allow for the increase in resonant frequency.

Accordingly, a $Co_2Z$ material having higher resonant frequency due to substitution can have a chemical formula of $Ba_{3-x}Sr_xCo_2Fe_{24-y}Al_yO_{41}$. In some embodiments, $0<x<1.5$ and $0<y<0.9$. Thus, in some embodiments, Ba, Fe, or both can be substituted out of the crystal structure.

Figure 2B:
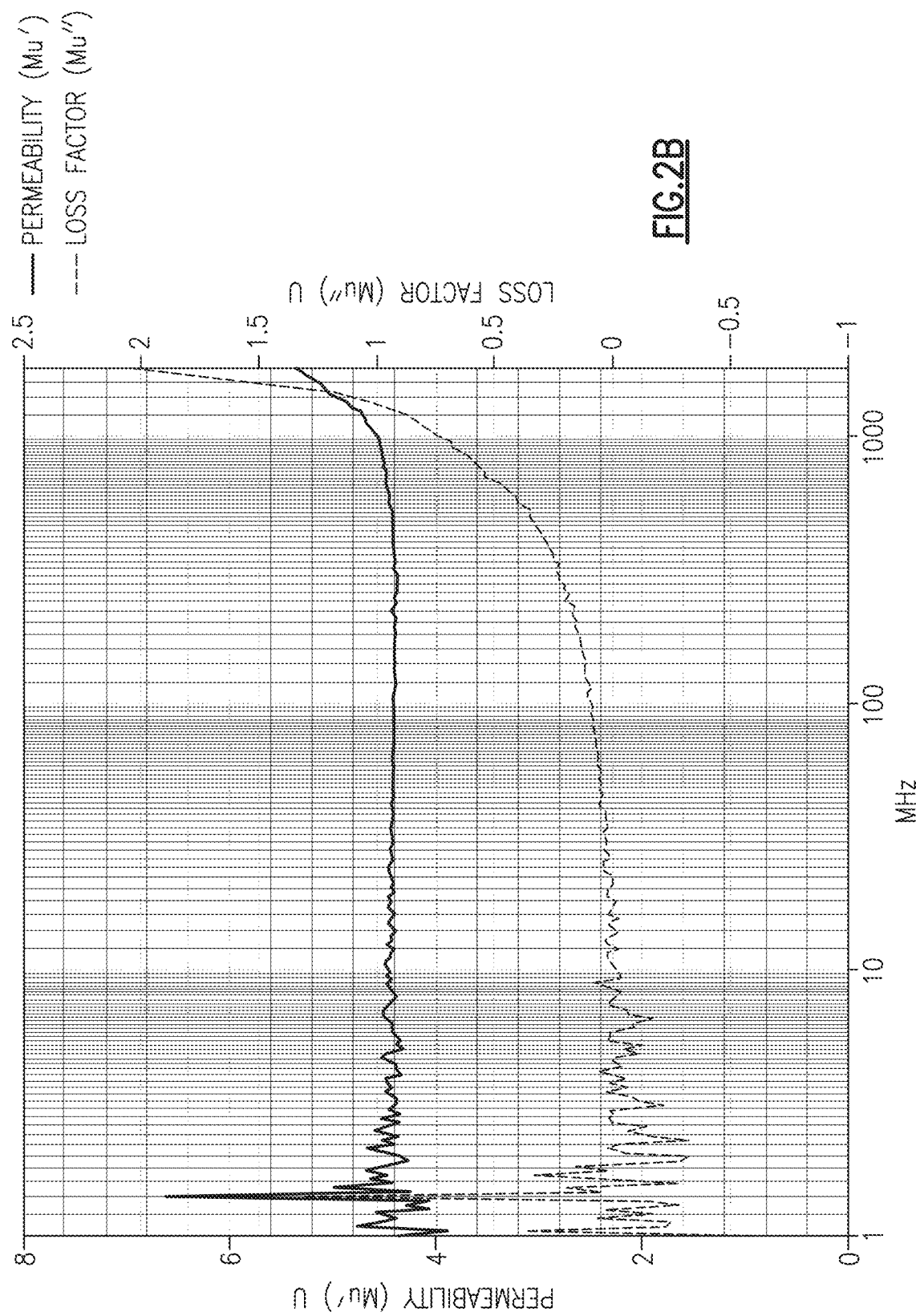

FIGS. 2A-B show impedance spectra using the above disclosed substitution technique of replacing Ba and Fe atoms with St or Al atoms. Typically, the impedance spectrum is performed using dielectric spectroscopy, also known as impedance spectroscopy or electrochemical impedance spectroscopy. The impedance spectra can show the different dielectric properties of a medium as a function of different frequencies.

In FIGS. 2A-B, the impedance spectra shows both permeability ($\mu'$) as well as loss factor ($\mu''$) across a range of frequencies. It can be advantageous for radio frequency applications to have minimal movement across the range of frequencies, which shows that there is minimal loss at those particular frequencies. When the loss factor begins to increase (e.g., spike), the material may experience more loss during use at those frequencies. Thus, at a certain point, the material would become unusable due to the high loss.

Along with minimizing the loss factor, it can be advantageous to adjust the spike in loss factor as far towards the high range of frequency as possible. As mentioned, when the loss factor spikes, the material becomes less useful in that frequency range. By manipulating the loss factor spike to higher frequencies, the material can be used at higher frequencies with minimized loss, such as the microwave range of 300 MHz to 300 GHz.

While it can be generally disadvantageous to have a material increase in loss factor at a specific frequency that is used, there can be a general loss tolerance depending on the application of the material. Therefore, even with the spikes shown in the figures, a loss tolerance can still be acceptable. For example, a loss tolerance can be less than about 0.1, 0.2, 0.3, 0.4, 0.5, 0.6, 0.7, 0.8, 0.9, or 1.0, though the specific loss tolerance is not limiting. Accordingly, the material may still be useful after the loss spike begins.

FIG. 2A shows the impedance spectra of an embodiment of the above described material when x=1.5 and y=0.9. As shown, the material can maintain a relatively low loss factor at low frequencies. Further, the major curvature of the spike in loss factor does not occur until well after 500 MHz. Depending on the loss tolerance of the device incorporating the material, embodiments of the material can be used in frequency ranges of about 700 MHz, about 900 MHz, about 1 GHz or over about 700 MHz, about 900 MHz, or about 1 GHz. Thus, embodiments of the disclosed material can be used in higher frequency ranges allowing for improved radiofrequency use.

FIG. 2B shows the impedance spectra of an embodiment of the above described material when x=1.5 and y=0.3. Similar to FIG. 2A, as shown the material can maintain a relatively low loss factor at low frequencies. Further, the major curvature of the spike in loss factor does not occur until well after 500 MHz. Depending on the loss tolerance of the device incorporating the material, embodiments of the material can be used in frequency ranges of about 700 MHz, about 900 MHz, about 1 GHz or over about 700 MHz, about 900 MHz, or about 1 GHz. Thus, embodiments of the disclosed material can be used in higher frequency ranges allowing for improved radio frequency use.

Comparing FIG. 2A to FIG. 2B, the curve for loss factor follows a generally similar path. However, embodiments of the material of FIG. 2B have a slightly lower overall loss factor in the lower frequency ranges. Further, the increase in loss factor in FIG. 2B occurs at a lower frequency than that shown in FIG. 2A. Regardless, both materials can be very advantageous for high frequency operations.

While the substitution of Ba with Sr can be advantageous, in some embodiments potassium can be used as a substitute on the barium site instead to allow for the substitution of trivalent ions for $Co^{2+}$. In some embodiments, potassium carbonate can be used for the substitution, for example ranging from 0 to 0.5 weight percent. This can greatly magnify the number of potential compositions possible to create the z phase.

Figure 3A:
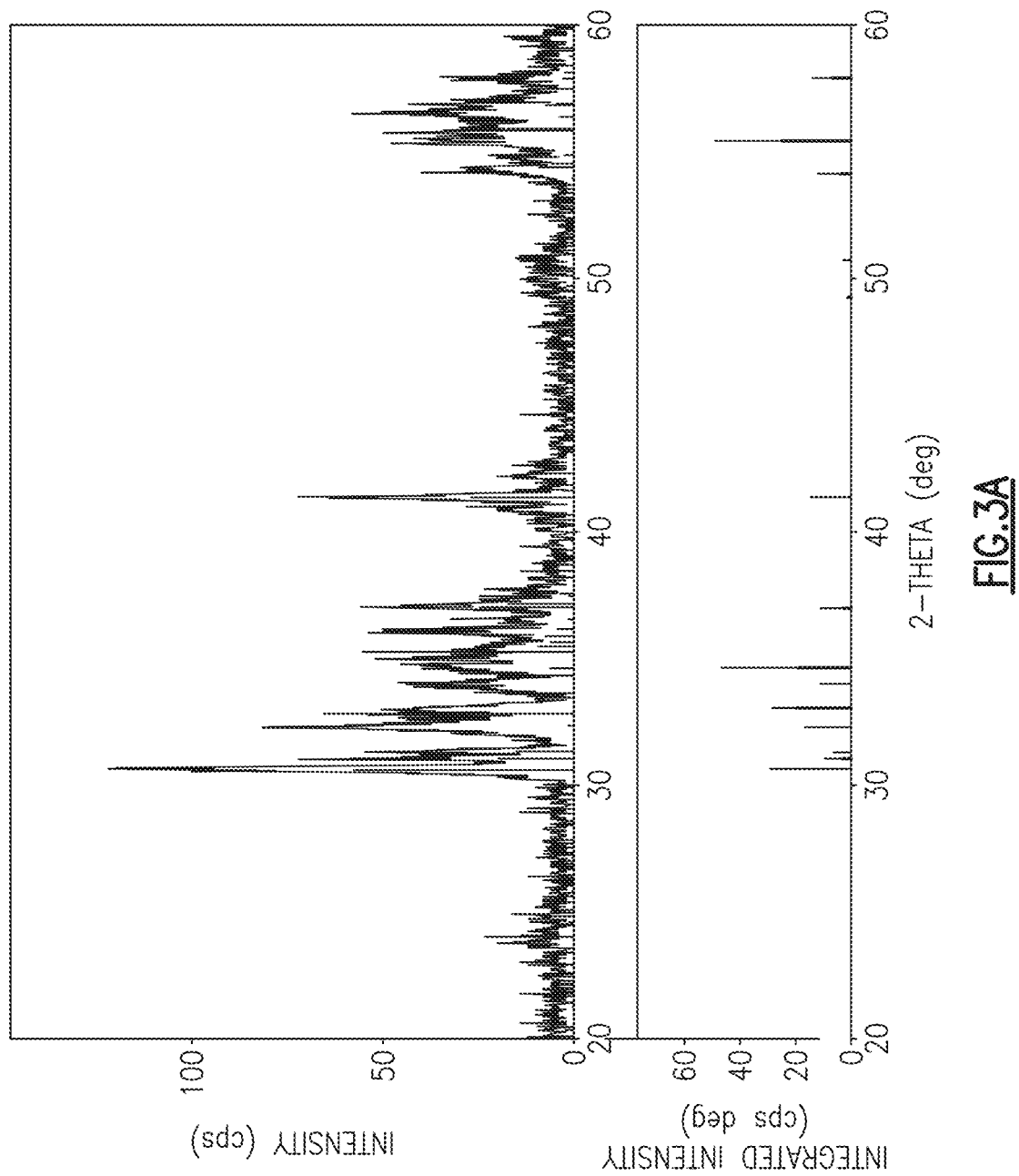
FIGS. 3A-B illustrate crystal structures of embodiments of the disclosed z-phase hexagonal ferrite materials.
Figure 3B:
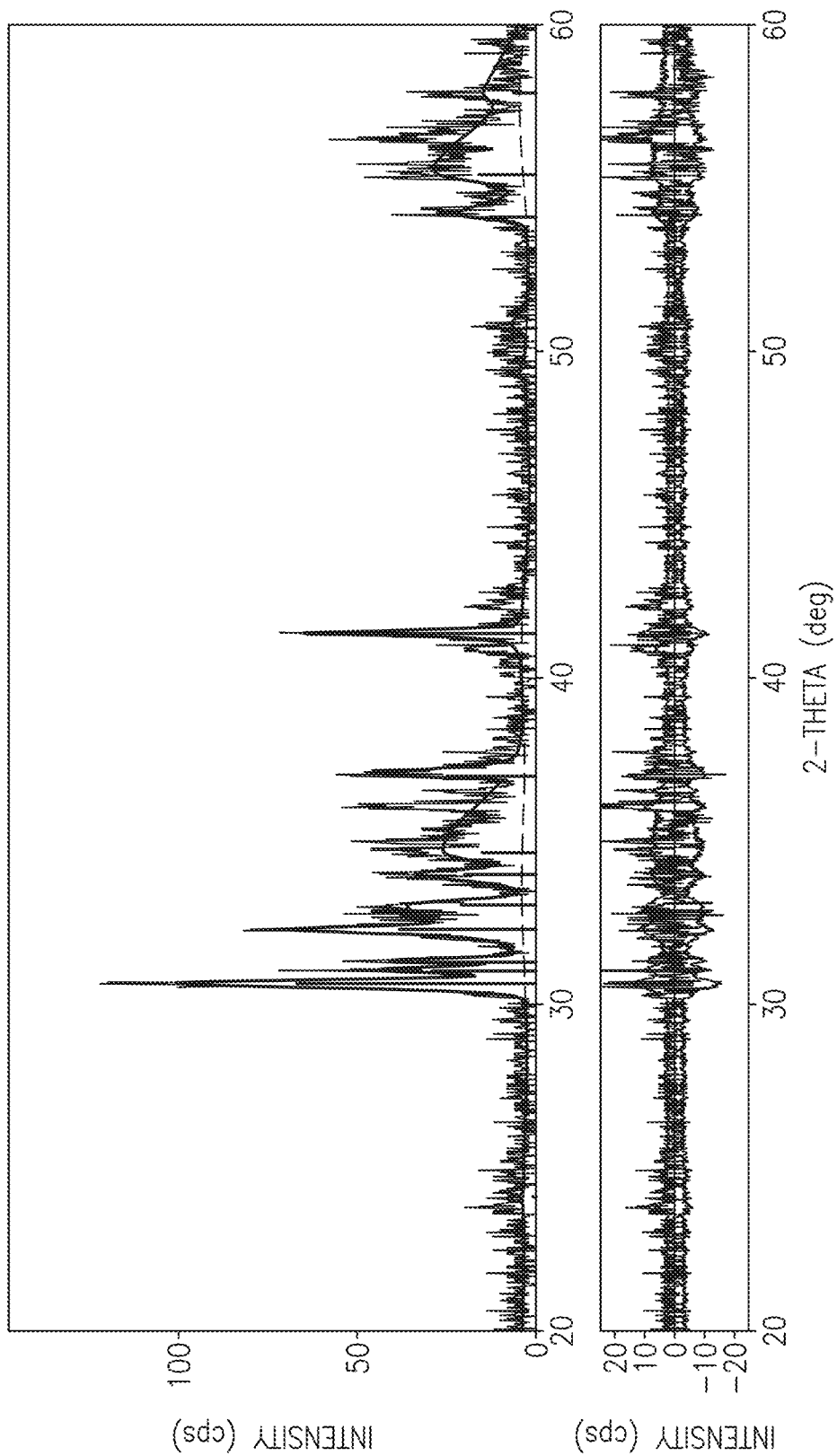

For example, FIGS. 3A-B illustrate that the z phase can be stabilized by the composition $Ba_{2.5}K_{0.5}Co^{(III)}_{1.5}Co^{(III)}_{0.5}Fe_{24}O_{41}$. FIGS. 3A-B illustrate intensity v. data using x-ray diffraction, which can then show the crystal structure of a specific material. The data points can then be compared against an index of patterns, which will disclose the spatial arrangement of the atoms within a structure. Therefore, while the specific elements may not be present, from the pattern of hotspots (e.g., where the peaks are increased), the crystal structure can be shown.

As shown by the x-ray diffraction patterns in FIGS. 3A-B, embodiments of the disclosed materials can form a stabilized z-phase hexaferrite structure. Data points from the above FIGS. 3A-B are shown in the below table:

| 2-theta (deg) | D (ang) | FWHM (deg) | Int. I (cps deg) | Int. W (deg) | Phase Data Name |
|---|---|---|---|---|---|
| 24.1187 | 3.68689 | 0.270117 | 0.177824 | 0.198339 | Barium Cobalt Iron Oxide(0, 0, 14) |
| 30.65(2) | 2.914(2) | 0.270(16) | 19.5(10) | 0.29(10) | Barium Cobalt Iron Oxide(1, 1, 0) |
| 31.05(5) | 2.878(4) | 0.21(3) | 6.5(6) | 0.23(12) | Barium Cobalt Iron Oxide(0, 0, 18) |
| 31.30(2) | 2.8550(19) | 0.12(2) | 4.3(5) | 0.13(7) | Barium Cobalt Iron Oxide(1, 0, 15) |
| 32.30(3) | 2.769(2) | 0.22(3) | 10.9(9) | 0.29(13) | Unknown |
| 33.05(4) | 2.708(3) | 0.83(5) | 19.0(10) | 0.9(5) | Barium Cobalt Iron Oxide(1, 1, 6) |
| 33.99(5) | 2.635(3) | 0.35(4) | 7.3(9) | 0.4(2) | Unknown |
| 34.66(12) | 2.586(8) | 1.96(12) | 30.9(14) | 2.1(13) | Barium Cobalt Iron Oxide(1, 0, 17) |
| 36.98(4) | 2.429(2) | 0.27(3) | 7.2(7) | 0.29(16) | Barium Cobalt Iron Oxide(2, 0, 6) |
| 41.37(3) | 2.1804(13) | 0.14(3) | 10.1(8) | 0.20(9) | Barium Cobalt Iron Oxide(2, 0, 12) |
| 49.2496 | 1.84864 | 0.509644 | 0.701169 | 0.493603 | Barium Cobalt Iron Oxide(2, 1, 6) |
| 50.7155 | 1.79859 | 0.509644 | 1.67943 | 0.498146 | Barium Cobalt Iron Oxide(2, 1, 9) |
| 54.12(7) | 1.693(2) | 0.51(8) | 8.1(9) | 0.6(5) | Barium Cobalt Iron Oxide(2, 1, 14) |
| 55.41(3) | 1.6567(8) | 1.66(11) | 32.5(18) | 2.0(12) | Barium Cobalt Iron Oxide(2, 1, 15) |
| 57.9058 | 1.59119 | 1.66023 | 8.9048 | 1.419252 | Barium Cobalt Iron Oxide(2, 0, 25) |

In some embodiments, the amount of potassium can be made equivalent to the amount of the trivalent ion according to the equation: $Ba_{3-x} K_x Co_{2-x} M^{(III)}x Fe_{24}O_{41}$. In some embodiments, $M^{(III)}$ can be, for example, any trivalent ion. This can include Sc, Mn, In, Cr, Ga, Co, Ni, Fe, Yb, or any of the other lanthanide ions where $0<x<0.5$. In some embodiments, Z-type hexaferrites can be synthesized using the above equation. For example, enhanced Z-type hexagonal ferrites can be synthesized when $M^{(III)}$ is Sc, Co, Mn, Cr, In, and Yb and when $x=0.5$.

Embodiments of the disclosed substituted dielectric materials can have numerous advantageous over other dielectric materials. For example, the process can preferentially align the atoms in the material, which can increase and boost the overall permeability of the dielectric material. Another advantageous property of embodiments of the disclosed material is that the Ba and/or Fe substitution can be performed in conjunction with the alkali doping/addition discussed above. However, in some embodiments, by substituting divalent ions for Ba and trivalent ions for Fe, alkali addition may be avoided while still maintaining high resonant frequencies. Thus, embodiments of the material can be used in frequency ranges of about 700 MHz, about 900 MHz, about 1 GHz or over about 700 MHz, about 900 MHz, or about 1 GHz.

Methods of Manufacturing Z-Type Hexagonal Ferrite Materials

Figure 4:
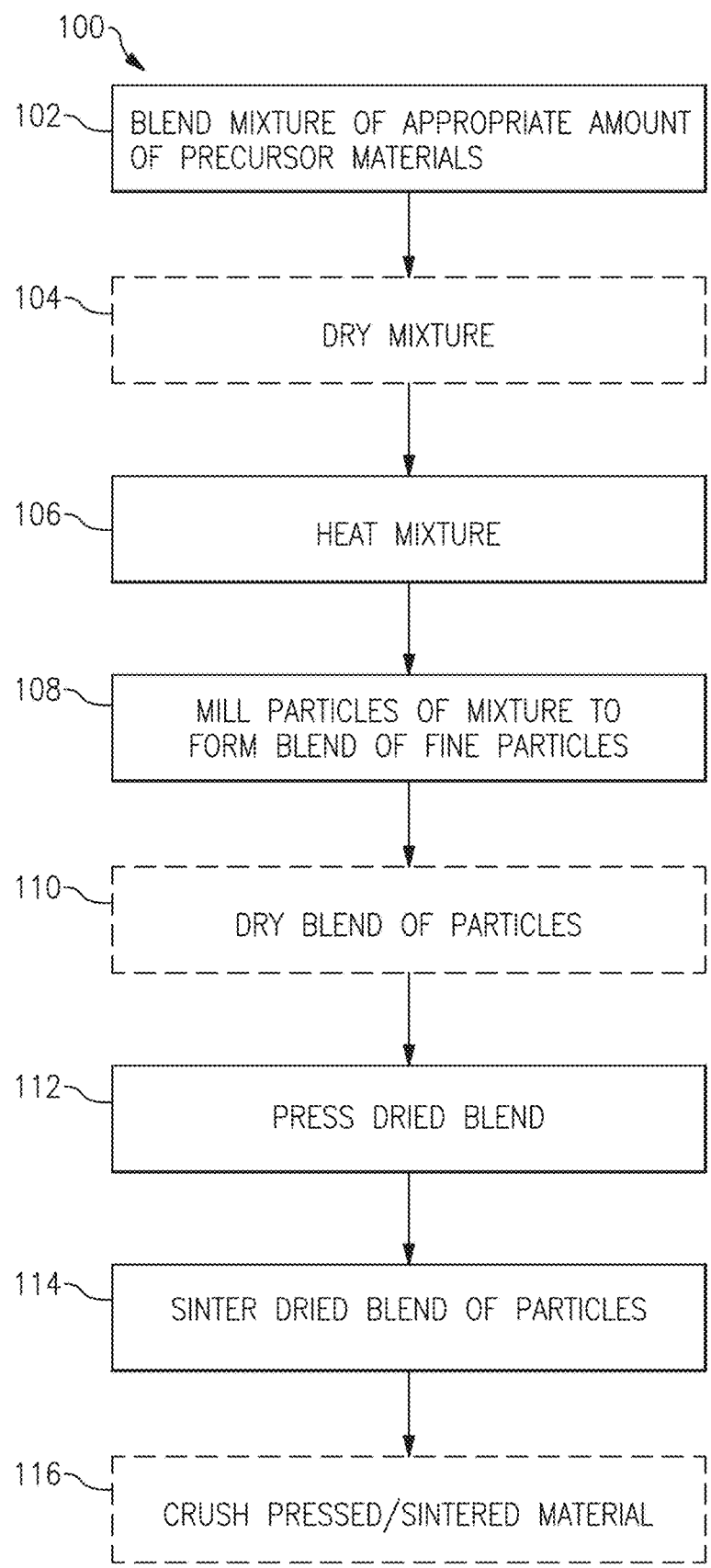
FIG. 4 shows a flow chart illustrating an embodiment of a method of forming the disclosed hexagonal ferrite material.

FIG. 4 illustrates a method 100 of forming a $Co_2Z$ material according to some embodiments. As shown in FIG. 4, appropriate amounts of precursor materials—reactants that may provide barium, cobalt, iron, one or more alkali metals, and oxygen that can form the magnetic material—are mixed together in Step 102. A precursor for $M^{(III)}$ may be added at step 102. In some embodiments, at least a portion of the oxygen may be provided in the form of an oxygen-containing compound of barium (Ba), cobalt (Co), iron (Fe), or one or more alkali metals. For example, these elements may be provided in carbonate or oxide forms, or in other oxygen-containing precursor forms known in the art. In some embodiments, one or more precursor materials may be provided in a non-oxygen-containing compound, or in a pure elemental form. In some embodiments, oxygen could be supplied from a separate compound, such as, for example, $H_2O_2$ or from gaseous oxygen or air. For example, in some embodiments, $BaCO_3$, $Co_3O_4$ and $Fe_2O_3$ precursors are mixed in a ratio appropriate for the formation of $Co_2Z$ (for example, about 22 wt. % $BaCO_3$, about 6 wt. % $Co_3O_4$, and about 72 wt. $Fe_2O_3$ along with between about 0.06 wt. and about 3.6 wt. % $K_2CO_3$. These precursor compounds may be mixed or blended in water or alcohol using, for example, a Cowles mixer, a ball mill, or a vibratory mill. These precursors may also be blended in a dry form.

The blended mixture may then be dried if necessary in Step 104. The mixture may be dried in any of a number of ways, including, for example, pan drying or spray drying. The dried mixture may then be heated in Step 106 at a temperature and for a period of time to promote calcination. For example, the temperature in the heating system used in heating Step 106 may increase at a rate of between about 20° C. per hour and about 200° C. per hour to achieve a soak temperature of about 1100° C.-1300° C., or about 1100° C. to 1250° C., which may be maintained for about two hours to about twelve hours. The heating system may be, for example, an oven or a kiln. The mixture may experience a loss of moisture, and/or reduction or oxidation of one or more components, and/or the decomposition of carbonates and/or organic compounds which may be present. At least a portion of the mixture may form a hexaferrite solid solution.

The temperature ramp rate, the soak temperature, and the time for which the mixture is heated may be chosen depending on the requirements for a particular application. For example, if small crystal grains are desired in the material after heating, a faster temperature ramp, and/or lower soak temperature, and/or shorter heating time may be selected as opposed to an application where larger crystal grains are desired. In addition, the use of different amounts and/or forms of precursor materials may result in different requirements for parameters such as temperature ramp rate and soaking temperature and/or time to provide desired characteristics to the post-heated mixture.

After heating, the mixture, which may have formed agglomerated particles of hexaferrite solid solution, may be cooled to room temperature, or to any other temperature that would facilitate further processing. The cooling rate of the heating system may be, for example, 80° C. per hour. In step 108, the agglomerated particles may be milled. Milling may take place in water, in alcohol, in a ball mill, a vibratory mill, or other milling apparatus. In some embodiments, the milling is continued until the median particle diameter of the resulting powdered material is from about one to about four microns, although other particle sizes, for example, from about one to about ten microns in diameter, may be acceptable in some applications. In some embodiments, high energy milling is used to mill the particles to a fine particle size of 0.2 to 0.9 microns in diameter. This particle size may be measured using, for example, a sedigraph or a laser scattering technique. A target median particle size may be selected to provide sufficient surface area of the particles to facilitate sintering in a later step. Particles with a smaller median diameter may be more reactive and more easily sintered than larger particles. In some embodiments, one or more alkali metals or alkali metal precursors or other dopant materials may be added at this point rather than, or in addition to, in step 102. In some embodiments, no alkali metals are used.

The powdered material may be dried if necessary in step 110 and the dried powder may be pressed into a desired shape using, for example, a uniaxial press or an isostatic press in step 112. The pressure used to press the material may be, for example, up to 80,000 N/m, and is typically in the range of from about 20,000 N/m to about 60,000 N/m·sup·2. A higher pressing pressure may result in a more dense material subsequent to further heating than a lower pressing pressure.

In step 114, the pressed powdered material may be sintered to form a solid mass of doped hexaferrite. The solid mass of doped hexaferrite may be sintered in a mold having the shape of a component desired to be formed from the doped hexaferrite. Sintering of the doped hexaferrite may be performed at a suitable or desired temperature and for a time period sufficient to provide one or more desired characteristics, such as, but not limited to, crystal grain size, level of impurities, compressibility, tensile strength, porosity, and in some cases, magnetic permeability. Preferably, the sintering conditions promote one or more desired material characteristics without affecting, or at least with acceptable changes to other undesirable properties. For example, the sintering conditions may promote formation of the sintered doped hexaferrite with little or minimal iron reduction. In one embodiment, the temperature used in the sintering step 114 is preferably between 1100° C. to 1250° C. According to some embodiments, the temperature in the heating system used in the sintering step 114 may be increased at a rate of between about 20° C. per hour and about 200° C. per hour to achieve a soak temperature of about 1150° C.-1450° C. or about 1100° C. to 1150° C. or about 1100° C.-1250° C. which may be maintained for about two hours to about twelve hours. The heating system may be, for example, an oven or a kiln. A slower ramp, and/or higher soak temperature, and/or longer sintering time may result in a more dense sintered material than might be achieved using a faster temperature ramp, and/or lower soak temperature, and/or shorter heating time. Increasing the density of the final sintered material by making adjustments, for example, to the sintering process can be performed to provide a material with a desired magnetic permeability, saturation magnetization, and/or magnetostriction coefficient. According to some embodiments of methods according to the present disclosure, the density range of the sintered hexaferrite may be between about 4.75 g/cm$^3$ and about 5.36 g/cm$^3$. A desired magnetic permeability of the doped hexaferrite may also be achieved by tailoring the heat treatment of the material to produce grains with desired sizes. The hexaferrite may also be crush pressed and further sintered in step 116 to form a final hexaferrite product.

The grain size of material produced by embodiments of the above method may vary from between about five micrometers and one millimeter in diameter depending upon the processing conditions, with even larger grain sizes possible in some aspects of methods according to the present disclosure. In some aspects, each crystal of the material may comprise a single magnetic domain. Both doped $Co_2Z$ and un-doped $Co_2Z$ may be members of the planar hexaferrite family called ferroxplana, having a Z-type ferrite crystal structure.

Figure 5:
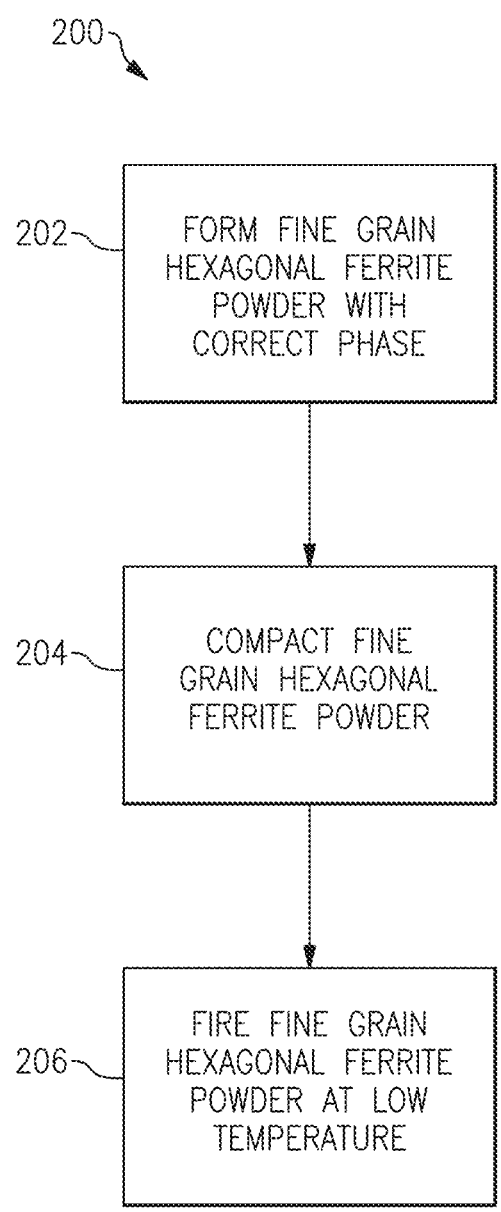
FIG. 5 shows a flow chart illustrating an embodiment of a method of forming the disclosed hexagonal ferrite material.

FIG. 5 illustrates a method 200 of forming textured $Co_2Z$ according to another embodiment adapted to reduce the magnetorestriction and improve the resonant frequency of the material. The method 200 begins with step 202 in which a fine grain hexagonal ferrite powder is formed. In one implementation, the fine grain hexagonal ferrite powder is a substituted barium cobalt ferrite Z-phase ($Co_2Z$) powder, such as described herein. The $Co_2Z$ powder can be synthesized using a chemical process known in the art such as co-precipitation. The $Co_2Z$ can also be synthesized via sol-gel, calcining, and mechanical milling using a Netzsch zeta-mill or the like. In some embodiments, the $Co_2Z$ powder has particle sizes of less than about 1 micron and surface areas of greater than about 6 m$^2$/g. In some embodiments, the $Co_2Z$ powder has an average particle size of less than about 1 micron and an average surface area of greater than about 6 m$^2$/g. In some embodiments, the $Co_2Z$ powder has a median particle size of between 300-600 nm, and a surface area of greater than about 15 m$^2$/g. It will be appreciated that the hexagonal ferrite powder can also comprise Y, W, U, X, or M phase hexagonal ferrite materials, depending on the application.

As FIG. 5 further shows, the method 200 further comprises step 204 in which the hexagonal ferrite powder is compacted by a known process such as cold isostatic pressing, uniaxial pressing, extrusion, or the like. As also shown in FIG. 5, the hexagonal powder is subsequently fired at step 206 at a temperature between about 1100° C. to 1250° C., which is lower than the standard, conventional sintering temperature for the same material. The resulting material is preferably a fine grained hexagonal ferrite material.

Certain aspects of the present disclosure provide processing techniques for increasing the permeability of $Co_2Z$ at higher frequencies. In some embodiments, the processing techniques involve methods of magnetic texturing of $Co_2Z$ to result in a textured $Co_2Z$ with improved magnetic properties. In some embodiments, the method of magnetic texturing used in forming $Co_2Z$ involves using a reaction sintering method, which includes the steps of aligning M-phase ($BaFe_{12}O_{19}$ uniaxial magnetization) with non-magnetic additives in a static magnetic field and reacting with BaO source and CoO to form Z-phase ($Ba_3Me_2Fe_{24}O_{42}$). In some embodiments, the method of magnetic texturing used in forming $Co_2Z$ involves using a rotating magnetic field method, which includes the steps of aligning $Co_2Z$ phase (planar magnetization) with magnetic texturing occurring in a rotating magnetic field. The inventor has found that the degree of alignment, thus permeability gain, is far superior in a rotating magnetic field.

In some embodiments, the processing technique for forming $Co_2Z$ includes making Z phase Fe-deficient to inhibit reduction of Fe, as dielectric and magnetic loss can be increased by reduction of Fe($Fe^{3+} \rightarrow Fe^{2+}$) at high temperatures. The processing technique includes the step of heat treatment or annealing in oxygen to inhibit reduction of Fe and cause $Fe^{2+} \rightarrow Fe^3$. In some embodiments, the processing technique includes doping the $Co_2Z$ with additives such as potassium and alkali metals to increase the resonance frequency, and hence increase Q at higher frequency ranges.

In some embodiments, the processing technique for forming $Co_2Z$ includes forming fine grain hexagonal ferrite particles. The process involves using high energy milling (e.g., zeta-milling) to reduce the particle size. The following chart shows that in one embodiment, high energy milling is used to produce $Co_2Z$ particle size in the range of 0.2 to 0.9 microns and surface area of 8-14 $m^2/g$. In this embodiment, the firing temperature is preferably 1150 to 1250° C.

| Process | Particle Size | Surface Area | Firing Temp. | Grain Size (Intercept Method) |
|---------|---------------|--------------|--------------|-------------------------------|
| Standard Milling | D50 = 1-5 microns | 1-3 $m^2/g$ | 1250-1350° C. | 10-30 microns |
| High Energy Milling | D50 = 0.2-0.9 microns | 8-14 $m^2/g$ | 1150-1250° C. | 2-15 microns |

Figure 6:
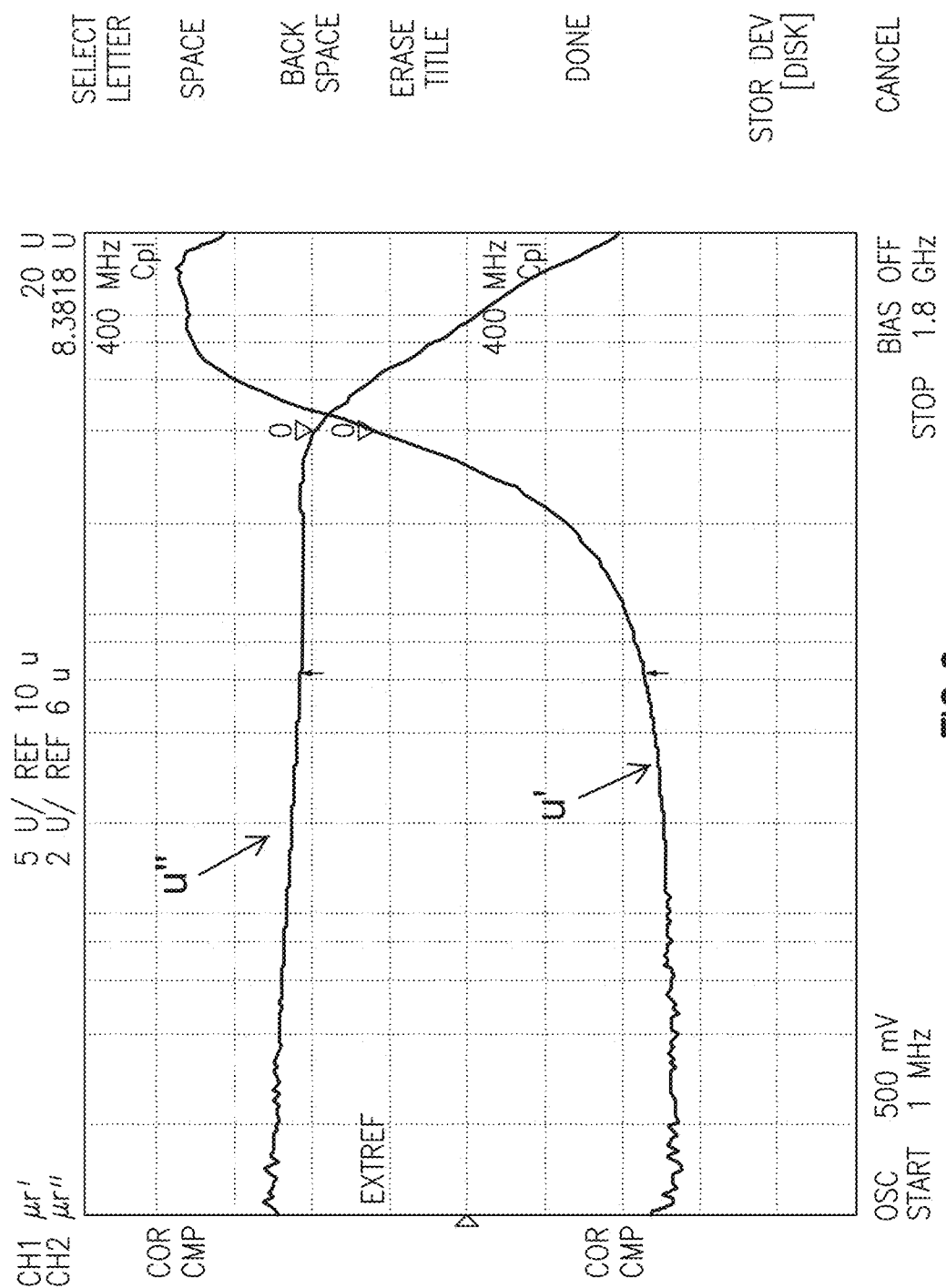
FIG. 6 shows an impedance plot illustrating the results of lower resonance peaks achieved when the material is prepared without zeta milling and without low firing.
Figure 7:
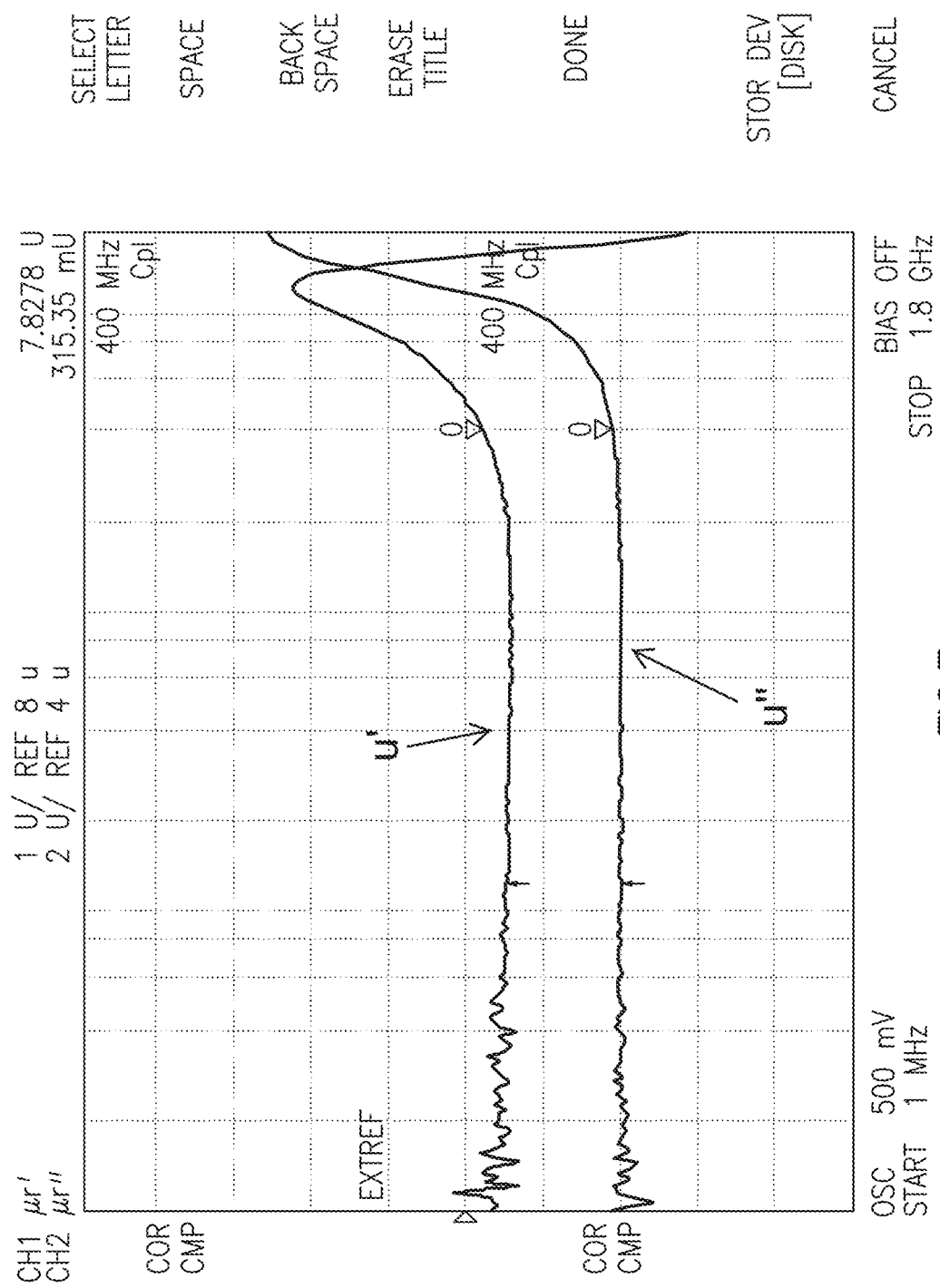
FIG. 7 shows an impedance plot illustrating the results of lower resonance peaks achieved when the material is zeta milled and fired at a higher temperature.
Figure 8:
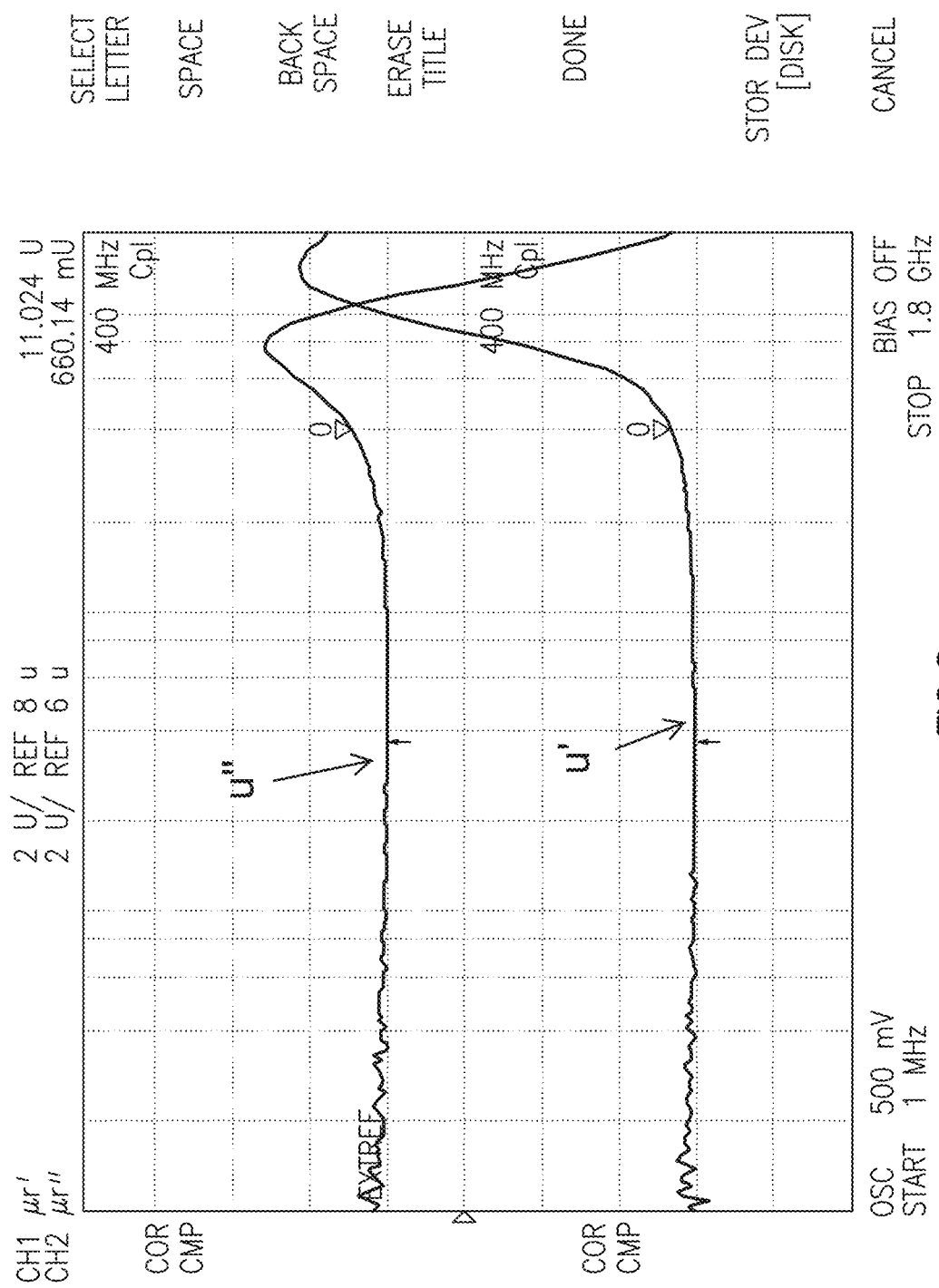
FIG. 8 shows an impedance plot illustrating the results of higher resonant peaks achieved using embodiments of a method to process hexagonal ferrite material.

FIGS. 6-8 illustrate impedance plots showing a $Co_2Z$ powder having a median particle size of about 2-3 microns and processed through a zeta-mill and fired at about 1100° C. and 1140° C. As shown in FIG. 6, the resonant peak, or maximum of the imaginary permeability curve, is shifted to higher frequencies with zeta milling and low firing temperatures. Without wishing to be bound by theory, it is believed that the hexagonal ferrite materials formed by the preferred processing techniques do not have or have very small internal stress field, thus leading to advantageous magnetorestriction. The hexagonal ferrite material formed according to methods described herein can be incorporated in a variety of RF devices such as high frequency antennas, inductors, and transformers.

FIGS. 6-8 show the change in the real component of the dimensionless complex relative magnetic permeability, $\mu'$ (referred to herein simply as the magnetic permeability) versus frequency for $Co_2Z$ powder. It can be seen that $Co_2Z$ demonstrates a relatively constant magnetic permeability [at lower frequencies]. At higher frequencies, the material demonstrates a rise in magnetic permeability leading to a peak followed by a rapid drop off as in magnetic permeability as frequency continues to increase. The peak of magnetic permeability will be referred to herein as the "resonant frequency."

FIG. 6 depicts the magnetic permeability of $Co_2Z$ powder with a median particle size of 2-3 microns. FIGS. 7 and 8 depict the magnetic permeability of the same $Co_2Z$ powder that has additionally been zeta-milled then fired at 11400 and 1100°, respectively. A comparison of FIG. 6 with FIGS. 7 and 8 establishes that zeta-milling and firing the $Co_2Z$ powder increases the resonant frequency of the material. Further, a comparison of FIGS. 7 and 8 shows that lowering the firing temperature from 1140° to 1100° leads to a further increase in the resonant frequency of the material. This increase in resonant frequency shows that RF device components made from zeta-milled and low fired $Co_2Z$ may be capable of retaining their magnetic permeability and operating in a frequency range higher than, or in a broader frequency range than that of similar devices or device components made from un-milled and higher-fired $Co_2Z$.

FIGS. 6-8 also illustrate the effect of Zeta-milling and low firing on the imaginary component of the complex relative magnetic permeability, $\mu''$, which corresponds to energy loss in the material at high frequencies. In FIGS. 6-8 it can be observed that maximum of the imaginary permeability curve, the "resonant peak" is shifted to higher frequencies when the $Co_2Z$ material is processed with powder that has been zeta-milled and low fired.

The above described methods can be used in conjunction with embodiments of the substituted hexagonal ferrite materials disclosed herein.

Radiofrequency Devices

Embodiments of the above disclosed dielectric material, and methods of manufacturing, can be used in the manufacturing of different radiofrequency devices. These devices can include, but are not limited to, filters, isolators, circulators, resonators, cellular phone components, laptop components, personal data assistant components, tablet components, or base station components. Further, the disclosed dielectric materials can be used in components that associate with cellular or radiofrequency signals, such as Bluetooth signals. In some embodiments, the disclosed dielectric materials can be used with antennas, such as high frequency antennas. The type of device that embodiments of the disclosed dielectric material is incorporated into is not limited, and below describes a few examples.

Figure 9:
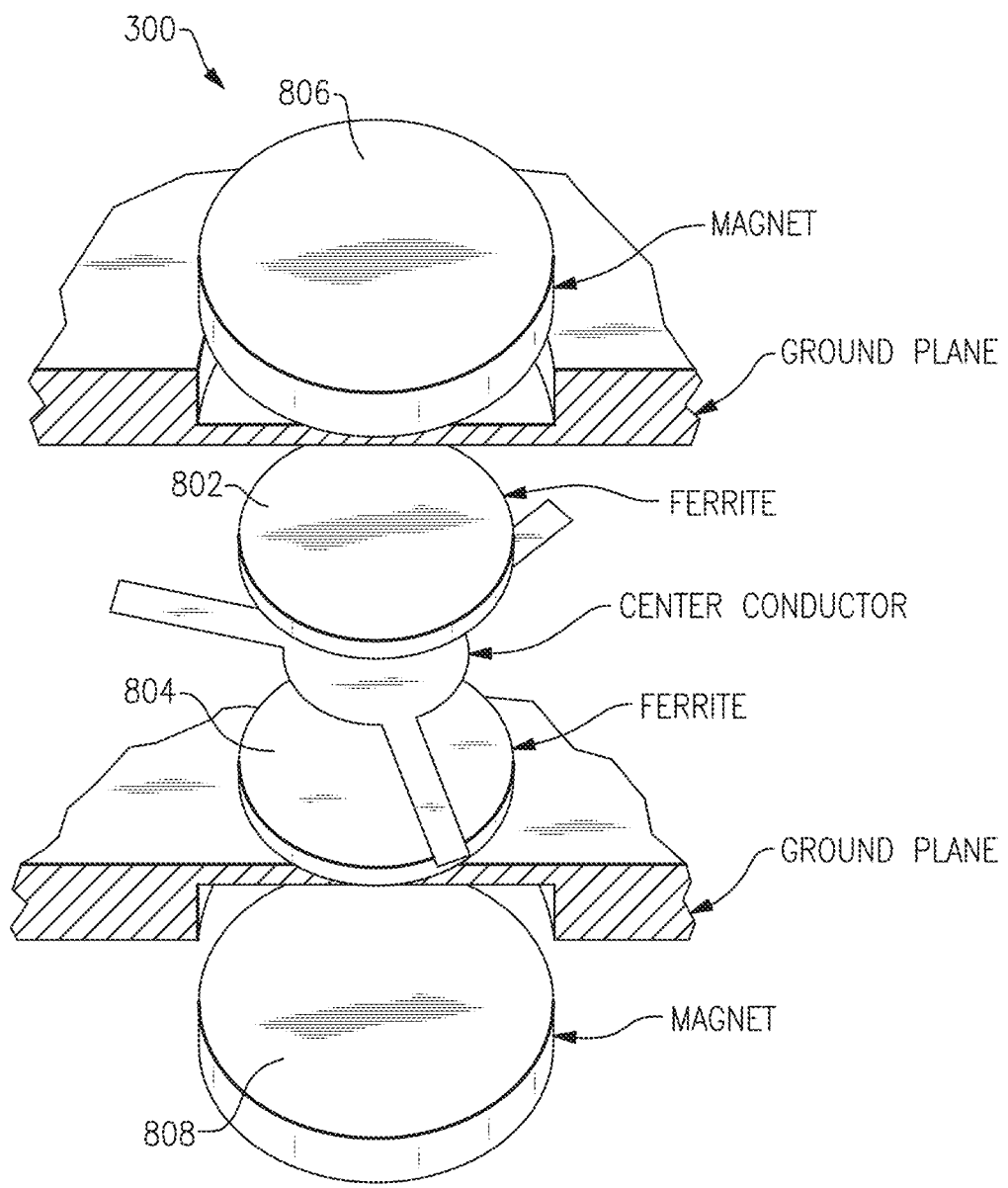
FIG. 9 schematically shows an example of a circulator incorporating embodiments of the disclosed hexagonal ferrite material.

FIG. 9 schematically shows an example of a circulator 300 incorporating an embodiment of an enhanced resonant frequency $Co_2Z$ material formed in accordance with certain embodiments described herein. As shown in FIG. 9, the circulator 300 can have a pair of ferrite disks 802, 804 disposed between a pair of cylindrical magnets 806, 808. The ferrite disks 802, 804 can be made of a resonant frequency enhanced $Co_2Z$ material according to certain embodiments of the present disclosure. The magnets 806, 808 can be arranged so as to yield generally axial field lines through the ferrite disks. In some embodiments, the ferrite disks have a magnetic resonance linewidth of 11 Oe or less.

Figure 10:
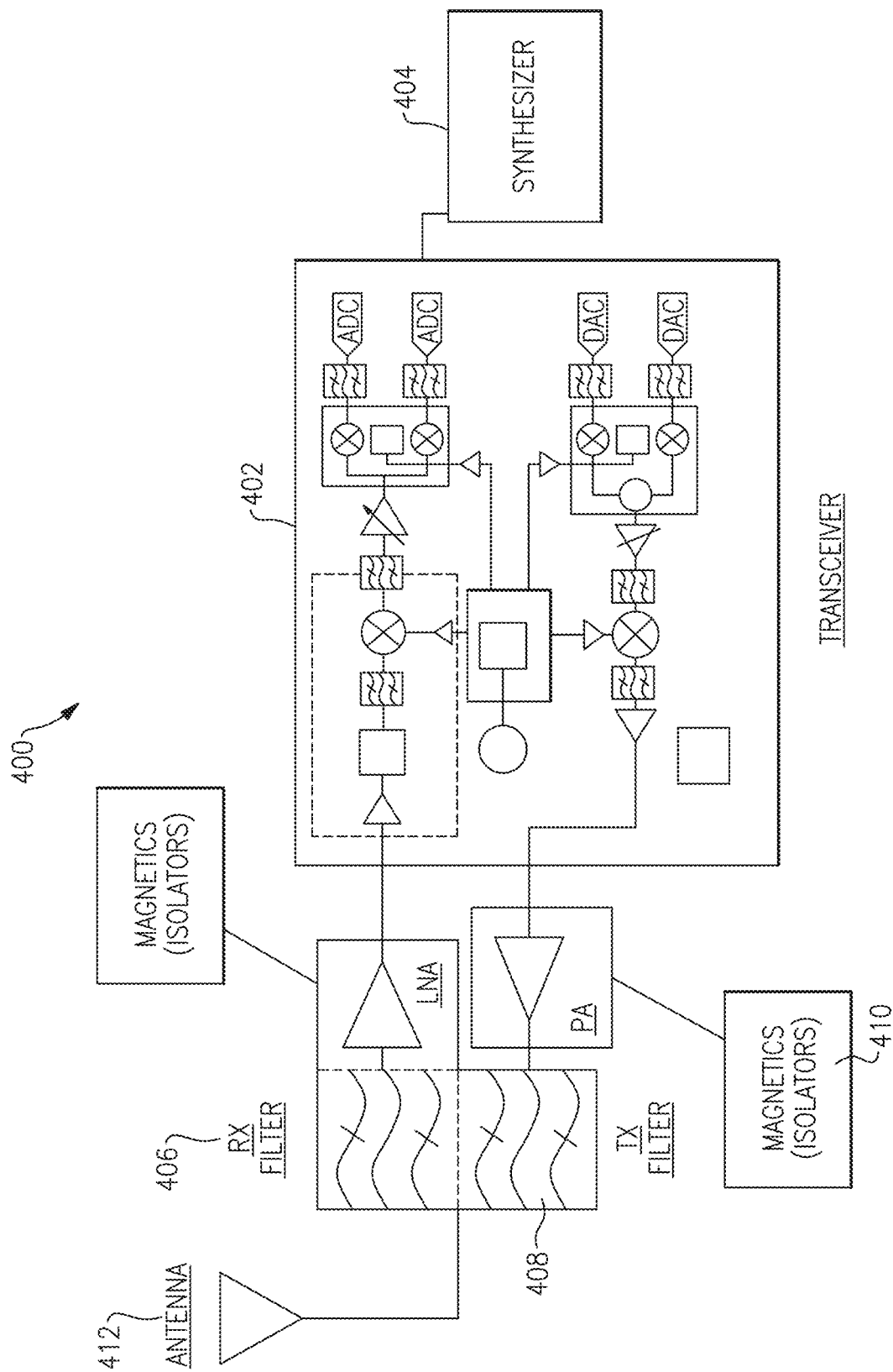
FIG. 10 illustrates a telecommunication base station system incorporating embodiments of the disclosed hexagonal ferrite material.

FIG. 10 shows a telecommunication base station system 400 comprising a transceiver 402, a synthesizer 404, an RX filter 406, a TX filter 408, and magnetic isolators 410 and an antenna 412. The magnetic isolators 410 can be incorporated in a single channel PA and connectorized, integrated triplate or microstrip drop-in. In some embodiments, the magnetic isolators 410 comprise a $Co_2Z$ material made in accordance with certain embodiments described in this disclosure. Further, other components, such as the filters 406/408 or antenna 412 can incorporate embodiments of the $Co_2Z$ material described above.

From the foregoing description, it will be appreciated that an inventive product and approaches for hexagonal ferrite materials are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. An enhanced z-type hexagonal ferrite having some barium atoms substituted for potassium atoms, the enhanced z-type hexagonal ferrite having a formula $Ba_{3-x}K_xCo_{2-x}M^{(III)}{}_xFe_{24}O_{41}$, $M^{(III)}$ being a trivalent ion, x being 0<x<0.5, and the ferrite having a resonant frequency of over about 700 MHz, $M^{(III)}$ selected from the group consisting of Sc, Mn, In, Cr, Ga, Co, Ni, Fe, Yb, or other lanthanide ions.

2. The enhanced z-type hexagonal ferrite of claim 1 wherein the enhanced z-type hexagonal ferrite is formed by a sintering process.

3. The enhanced z-type hexagonal ferrite of claim 1 wherein the enhanced z-type hexagonal ferrite has a resonant frequency of over about 1 GHz.

4. A radio frequency device comprising the enhanced z-type hexagonal ferrite of claim 1.

5. An antenna comprising the enhanced z-type hexagonal ferrite of claim 1.

6. A method of forming a radiofrequency device, the method comprising:
   blending a mixture of precursor materials including barium, cobalt, iron, and oxygen;
   drying, heating, milling, and pressing the mixture to form pressed particles;
   sintering the pressed particles to form a hexagonal ferrite material having a composition $Ba_{3-x}K_xCo_{2-x}M^{(III)}{}_xFe_{24}O_{41}$, x being 0<x<0.5, the mixture of precursor materials further including a precursor for $M^{(III)}$, $M^{(III)}$ selected from the group consisting of Sc, Mn, In, Cr, Ga, Co, Ni, Fe, Yb, or other lanthanide ions; and
   forming a radiofrequency device from the hexagonal ferrite material.

7. The method of claim 6 wherein the hexagonal ferrite material has a resonant frequency of greater than 1 GHz.

8. The method of claim 6 wherein the radiofrequency device is an antenna.

9. A circulator for a radiofrequency device, the circulator comprising:
   an enhanced z-type hexagonal ferrite having some barium atoms substituted for potassium atoms, the enhanced z-type hexagonal ferrite having a formula $Ba_{3-x}K_xCo_{2-x}M^{(III)}{}_xFe_{24}O_{41}$, $M^{(III)}$ being a trivalent ion, x being 0<x<0.5, and the ferrite having a resonant frequency of over about 700 MHz, $M^{(III)}$ selected from the group consisting of Sc, Mn, In, Cr, Ga, Co, Ni, Fe, Yb, or other lanthanide ions.

10. The circulator of claim 9 wherein the hexagonal ferrite is formed by a sintering process.

11. The circulator of claim 9 wherein the hexagonal ferrite has a resonant frequency of over about 1 GHz.

12. An enhanced z-type hexagonal ferrite having some barium atoms substituted for potassium atoms, the enhanced z-type hexagonal ferrite having a formula $Ba_{3-x}K_xCo_{2-x}M^{(III)}xFe_{24}O_{41}$, $M^{(III)}$ being a trivalent ion and selected from the group consisting of Co, Mn, Cr, In, or Yb, x being 0.5, and the ferrite having a resonant frequency of over about 700 MHz.

13. A method of forming a radiofrequency device, the method comprising:
   blending a mixture of precursor materials including barium, cobalt, iron, and oxygen;
   drying, heating, milling, and pressing the mixture to form pressed particles;
   sintering the pressed particles to form a hexagonal ferrite material having a composition $Ba_{3-x}K_xCo_{2-x}M^{(III)}xFe_{24}O_{41}$, x being 0.5, the mixture of precursor materials further including a precursor for $M^{(III)}$, $M^{(III)}$ selected from the group consisting of Co, Mn, Cr, In, or Yb, and
   forming a radiofrequency device from the hexagonal ferrite material.

14. A circulator for a radiofrequency device, the circulator comprising:

an enhanced z-type hexagonal ferrite having some barium atoms substituted for potassium atoms, the enhanced z-type hexagonal ferrite having a formula $Ba_{3-x} K_x Co_2\text{-x } M^{(III)}{}_x Fe_{24}O_{41}$, $M^{(III)}$ being a trivalent ion and selected from the group consisting of Co, Mn, Cr, In, or Yb and x=0.5, and the ferrite having a resonant frequency of over about 700 MHz.

15. An antenna comprising the enhanced z-type hexagonal ferrite of claim 12.

16. The method of claim 13 wherein the radiofrequency device is an antenna.

17. The circulator of claim 14 wherein the hexagonal ferrite has a resonant frequency of over about 1 GHz.

* * * * *